United States Patent [19]

Pyrih et al.

[11] 4,115,110
[45] Sep. 19, 1978

[54] VANADIUM RECOVERY PROCESS

[75] Inventors: Roman Z. Pyrih; Robert S. Rickard, both of Golden, Colo.

[73] Assignee: Earth Sciences, Inc., Golden, Colo.

[21] Appl. No.: 786,026

[22] Filed: Apr. 8, 1977

[51] Int. Cl.² ............... C22B 34/22; C22C 38/24; C01G 31/00

[52] U.S. Cl. ................... 75/101 R; 75/121; 75/123 J; 423/62; 423/65; 423/68; 423/508; 423/53

[58] Field of Search .................. 423/62, 65, 68; 75/101 R, 121

[56] References Cited

U.S. PATENT DOCUMENTS

| | | | |
|---|---|---|---|
| 1,651,967 | 12/1927 | Reed | 423/68 |
| 2,749,211 | 6/1956 | Lundquist | 423/62 |
| 2,920,936 | 1/1960 | Dille et al. | 423/65 |

FOREIGN PATENT DOCUMENTS

| | | | |
|---|---|---|---|
| 1,331,932 | 9/1973 | United Kingdom | 423/62 |
| 269,779 | 4/1927 | United Kingdom | 423/65 |

*Primary Examiner*—Herbert T. Carter

*Attorney, Agent, or Firm*—Sheridan, Ross, Fields & McIntosh

[57] ABSTRACT

A process for recovering vanadium values from carbonaceous type vanadium ores, and vanadium scrap, such as vanadium contaminated spent catalyst, is disclosed which comprises roasting the vanadium containing material in air at a temperature less than about 600° C to produce a material substantially devoid of organic matter, subjecting said roasted material to a further oxidizing roast in an oxygen atmosphere at a temperature of at least about 800° C for a period sufficient to convert substantially all of the vanadium to the soluble form, leaching the calcine with a suitable dilute mineral acid or water at a pH of neutral to about 2 to recover vanadium values, precipitating vanadium values as iron vanadate from the leach solution with a soluble iron compound at a pH from neutral to about 1, and recovering ferrovanadium from the iron vanadate by a reduction vacuum smelting operation. The conversion of vanadium in the ore to the soluble form by the oxidizing roast is accomplished without the addition of an alkaline salt during calcining.

11 Claims, 3 Drawing Figures

VANADIUM RECOVERY PROCESS

BACKGROUND OF THE INVENTION

Carbonaceous type vanadium ores, such as "coaly" ores and carbon contaminated ores, contain organic matter up to about 20 percent by weight. The conventional salt roast process for recovering vanadium has not been successful on carbonaceous type vanadium ores.

Salt roast processes for vanadium recovery are typified by those disclosed in U.S. Pat. No. 3,733,193 and the disadvantages of this salt roast process and those disclosed in other patents are discussed in U.S. Pat. No. 3,929,461, which latter patent disclosed an improvement in a salt roast process.

The present invention is directed to a process which is effective for recovering vanadium values from carbonaceous type vanadium ores, which is more economical than the conventional salt roast process, and which is designed to produce a final high purity ferrovanadium product having a high ratio of vanadium to iron.

SUMMARY OF THE INVENTION

A high purity iron vanadate is recovered from carbonaceous vanadium ores by the following combination of steps. The ore is first roasted in air to remove carbonaceous material and recover volatile values such as selenium and rhenium by vaporization. The calcine is then further roasted in an oxygen atmosphere to convert the vanadium values to soluble form. Following this step, the vanadium values are dissolved in a suitable weak mineral acid or water. Iron vanadate is then precipitated from the leach solution with a suitable iron salt. If the final recovery product is ferrovanadium, it is produced from the iron vanadate by reduction and vacuum smelting.

The process can be used to recover vanadium from vanadium scrap, such as vanadium bearing catalysts and alloys.

DESCRIPTION OF THE PREFERRED EMBODIMENTS

The invention will now be described with reference to the accompanying drawings and the examples which follow.

Vanadium ores occur in the some areas of the United States mixed with various organic or carbonaceous materials, and other impurities in the form of trace elements found with most vanadium ores. These carbonaceous materials and impurities cannot be removed by concentrating the ore.

The carbonaceous content of the ore often exceeds twenty percent and its presence in this amount makes the recovering of a substantial amount of the vanadium values by the conventional salt roast process economically impractical or even impossible.

The trace element impurities most likely to appear in this type ore include the elements selenium, rhenium, phosphorous, uranium, calcium, copper, manganese, aluminum, silicon, sodium, sulphur, lead, zinc, nickel, molybdenum, chromium, and others in smaller amounts than these.

Of course, it is an objective of each step of the process to recover the maximum amounts of vanadium and eliminate the maximum number and amount of impurities so that they will not appear as contaminants in iron vanadate or ferrovanadium products. A further objective is to recover impurities as saleable by-products to enhance the economics of the process.

Figure 1:
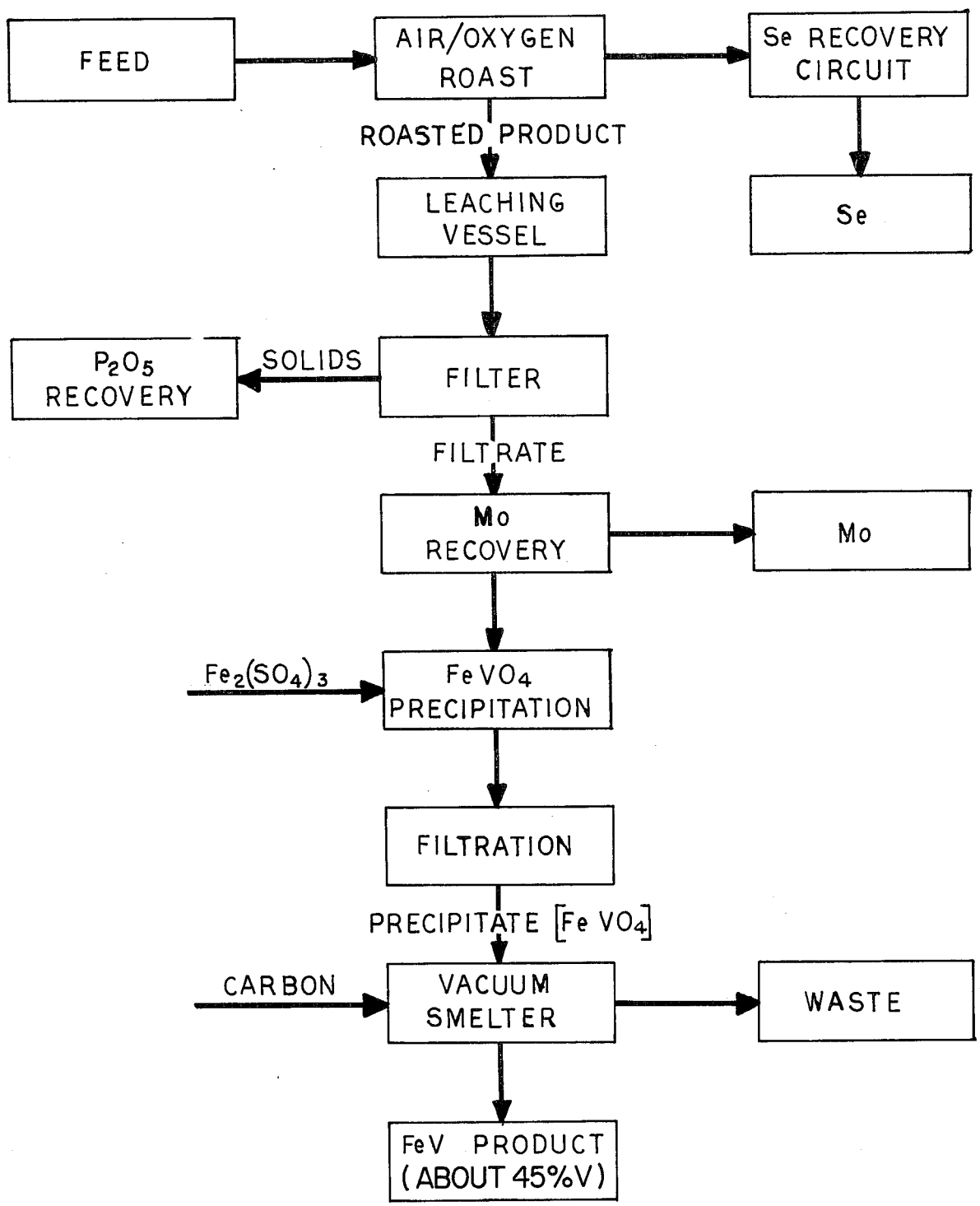
FIG. 1 is a flow sheet of the process of the invention.

As the flow sheet of FIG. 1 shows, the first step in the process is an air roast of the ore starting material to remove carbonaceous and other volatilizable material.

A typical carbonaceous ore analysis is as follows:

| Component | Wt. Percent |
|---|---|
| $V_2O_5$ | 1.0 |
| $P_2O_5$ | 13.8 |
| $U_3O_8$ | 0.01 |
| Se | 0.0225 |
| Mn | 0.05 |
| S | 3.6 |
| Organic Carbon | 20.1 |
| Organic Hydrogen | 0.6 |
| Organic Nitrogen | 0.6 |
| Organic Oxygen | 2.8 |
| CaO | 18.8 |
| $SiO_2$ | 13.8 |
| $Al_2O_3$ | 4.3 |
| Combined $H_2O$ | 2.0 |
| Free $H_2O$ | 8.0 |
| LOI* | 37.7 |
| Undetermined | 12.5 |

*Loss on ignition

A typical particle size range for the ore used in the example which follows, is as follows:

| Particle Size M (Tyler) | % Passing |
|---|---|
| 3 | 100 |
| 6 | 60 |
| 10 | 35 |
| 20 | 20 |
| 35 | 10 |
| 65 | 6.5 |
| 150 | 3.7 |
| 270 | 2.2 |
| 400 | 1.6 |

The air roast on the ore used in the examples was performed in a conventional rotary kiln. The temperature of the air roast must not exceed about 600° C as it was found that heating above this temperature reduces vanadium recovery significantly. The roasting is continued for a period sufficient to drive off substantially all of the organic matter. A substantial portion of the selenium is driven off in this step and recovered in scrubbers as shown in the flow sheet of FIG. 1.

For converting the vanadium values to soluble form, the calcine from the air roast is further roasted in an oxygen atmosphere. This roast apparently converts most of the vanadium present to the higher valence state. Pure oxygen is used for the roast. Air cannot be used as the vanadium will react with nitrogen in the air. The roast must be performed for a sufficient period to convert substantially all of the vanadium to the soluble form. A period of at least 8 hours at a temperature in excess of about 750° C is preferred. A preferred temperature is between 800°–900° C. It was found that a roasting time of at least about 8 hours was required at this temperature to convert substantially all of the vanadium present to the soluble form. Upon completion of the roast in a rotary kiln or other type roaster the calcine is transferred hot with minimum contact with air to the leachant used in the leaching step. The hot calcine is quenched when it contacts the leachant.

The leachant used to leach the vanadium from the calcine is a mineral acid other than phosphoric acid, or water. The preferred acids are sulfuric and hydrochloric, although nitric acid can be used. As will be explained more fully later, an acidity of not more than about pH 2 for the leachant is used.

Tests were run on a number of leach slurries in which the calcine has been leached to determine the effectiveness of the roasting procedure in recovering vanadium from the feed material. Typical of these tests are those on roasts 20 and 22 of Table I below, in which the following procedure was used.

For roast 20, about 250 grams of raw shale (98% -3 Mesh) were charged into the rotary kiln and air roasted for 3 hours at 550° C. This roast eliminated most of the organic material present in the shale. After 3 hours, the kiln was sealed and a 6-hour oxygen roast begun. The ore temperature averaged 800° C. After 6 hours, the ore was quenched and dilute acid leached (pH 3.0) for 3 hours. It should be noted that about 73 percent of the vanadium was extracted. The exact procedure was followed for roast 22 except that the oxygen roast lasted 8 hours. In this test an 80 percent recover of vanadium was obtained.

TABLE I

Recovery of Vanadium from the Feed by the Roasting Procedure

Roast #20

| Ore Sample | Weight (g) | Assay (% $V_2O_5$) | Total ($V_2O_5$,g) | Distribution (%) | Extraction (%) |
|---|---|---|---|---|---|
| Head | 122.6 | 1.93 | 2.366 | 100 | |
| Solution | 3.7101 | 0.475g/l | 1.761 | 73 | 73 |
| Tail | 122.6 | 0.527 | 0.646 | 27 | |
| Calculated Head | 122.6 | (1.96) | 2.407 | 100 | |

Roast #22

| Ore Sample | Weight (g) | Assay (% $V_2O_5$) | Total ($V_2O_5$,g) | Distribution (%) | Extraction (%) |
|---|---|---|---|---|---|
| Head | 183.0 | 1.93 | 3.532 | 100 | |
| Solution | 3.5001 | 0.883g/l | 3.092 | 80 | 80 |
| Tail | 183.0 | 0.417 | 0.763 | 20 | |
| Calculated Head | 183.0 | (2.10) | 3.855 | 100 | |

Selenium assays of an air roasted coaly bed sample indicated that about 75 percent of the selenium is volatilized with the off gases during air roasting at 600° C. The selenium content of the coaly bed before roasting averaged 222.5 PPM. After air roasting for 3 hours at 600° C, only 81.7 ppm Se was found in the roasted coaly bed product. Weight loss on ignition was between 30 and 35 percent.

Due to the conversion of vanadium to the soluble form by the oxygen roast whih does not require the use of an alkaline salt as does the conventional "salt roast" conversion, it was found that the vanadium can be leached from the calcine without solubilizing impurities contained in the calcine, a result that cannot be obtained when the "salt roast" conversion accompanied by the necessary use of an alkaline salt is utilized.

It was found that the leaching stage was an optimum place to remove a good many of the impurities. It was discovered that, surprisingly, the solubility of $V_2O_5$ was not substantially affected by the strength of the acid used as the leachant while the solubility of many of the impurities increased with the strength of the acid leachant. The result is that substantially all of the vanadium values in the calcine can be solubilized with an acid leach no stronger than about pH 2 and many of the impurities remain undissolved and are eliminated in the residue from filtration of the acid leach slurry. This applies to any selenium remaining in the calcine as selenium is insoluble in the acid leach at this pH. Of course, a similar result is obtained with a water leach as $V_2O_5$ is highly soluble in water and many of the impurities are insoluble in water. An alkali metal carbonate leach can also be used but this adds alkali metal to the system necessitating its removal by ion exchange or other conventional procedure before precipitation of iron vanadate to prevent its appearance therein as an impurity.

The preferred mineral acid leachant is sulfuric acid although hydrochloric acid is highly satisfactory and nitric acid is also suitable. Phosphoric acid is undesirable because it adds phosphorous to the system requiring its subsequent removal to prevent its appearance as an impurity in the final product.

A series of tests were run on the calcine of coaly bed ore to test the effect of acid strength on the dissolution of vanadium in the roast and the results recorded in Table II. The tests are indicated by roast or calcine number and identical roast numbers in the various tables indicate identical roasts or calcines.

TABLE II

The effect of acid strength on the dissolution vanadium values in the calcine

| Roast No. | Leach Description | Percent $V_2O_5$ Leached | | |
|---|---|---|---|---|
| | | First Leach | Second Leach | Total |
| 47 | Leached at pH 2.1, first in 0.5% by vol. HCl; tails releached in 2.0% by vol. HCl. | 70 | 19 | 89 |
| 48 | Leached at pH 1.9, first in 0.5% by vol. $H_2SO_4$; tails releached in 2.0% by vol. $H_2SO_4$. | 76 | 19 | 95 |
| 49 | Leached at pH 1.9, first in 0.5% by vol. $H_2SO_4$; tails releached in 2.0% by vol. $H_2SO_4$. | 79 | 18 | 97 |
| 50 | Leached at pH 2.3, first in 0.1% by vol. $H_2SO_4$; tails releached in 0.5% by vol. $H_2SO_4$. | 76 | 11 | 87 |
| 51 | Leached at ph 3.1, first in 0.1% by vol. HCl; tails releached in 0.1% by vol. HCl. | 77 | 5 | 82 |
| 52 | Leached at pH 2.8, first in 0.05% by vol. $H_2SO_4$; tails releached in 0.1% by vol. $H_2SO_4$. | 68 | 6 | 74 |
| 53 | Leached at pH 5.3, first in demineralized water; tails releached in 0.1% by vol. | 72 | 9 | 81 |

TABLE II-continued

The effect of acid strength on the dissolution vanadium values in the calcine

| Roast No. | Leach Description | Percent $V_2O_5$ Leached | | |
|---|---|---|---|---|
| | | First Leach | Second Leach | Total |
| 54 | $H_2SO_4$. Leached at pH 2.5, first in 0.1% by vol. $H_2SO_4$; tails releached in 0.1% by vol. $H_2SO_4$. | 77 | 7 | 84 |

The results of Table II show that vanadium recovery is independent of acid strength or type. About 72 percent of vanadium was leached with demineralized water and about 75 percent with 0.5 percent sulfuric acid. Increasing the acidity of all acid leachant did not substantially increase the amount of vanadium dissolved. Even with very dilute sulfuric acid solutions, vanadium recoveries of at least 80 percent can be expected from oxygen roasted coaly bed ore, particularly if releaching is used.

Figure 2:
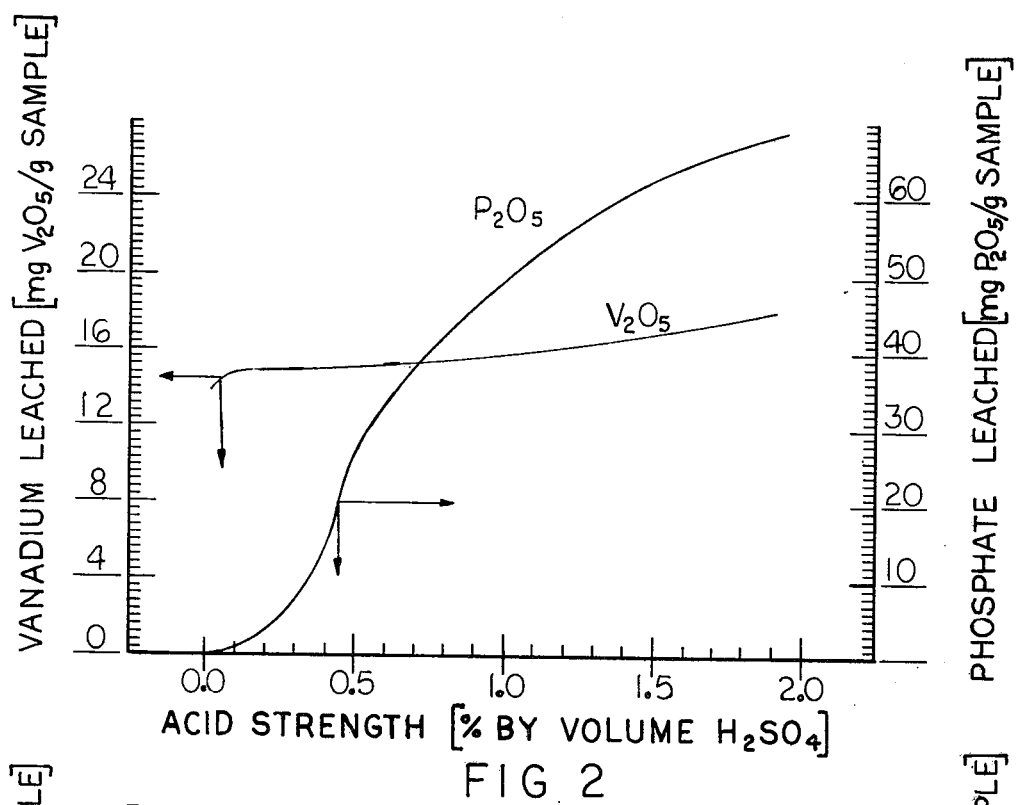
FIG. 2 is a graph showing the solubility of vanadium pentoxide and phosphorus pentoxide in relationship to the strength of sulfuric acid leachant.
Figure 3:
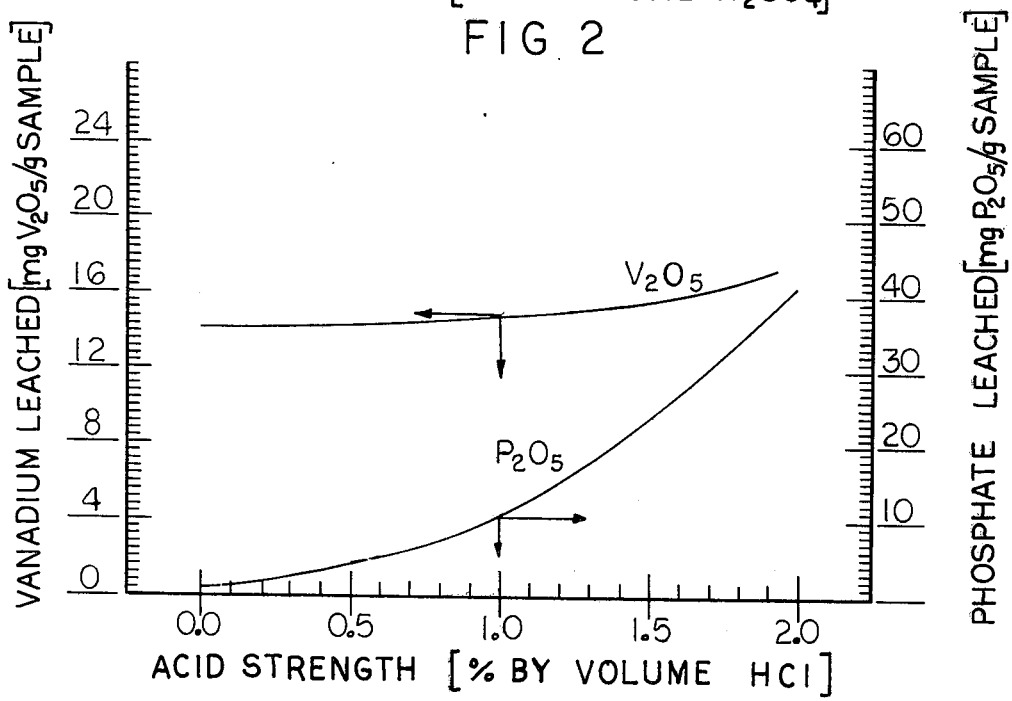
FIG. 3 is the same type of graph as FIG. 2 for hydrochloric acid leachant.

The graphs of FIGS. 2 and 3 are based on results of similar tests as those of Table II. The graphs also show that vanadium solubility is substantially independent of acid leachant strength or concentration. The graphs further show that vanadium leaching is independent of phosphorus leaching and that very little phosphorus will be leached using weak acid leachant at a concentration where almost all of the vanadium will be leached. Both the graps and the results of Table II show that leaching at an acid strength not greater than pH 2, and preferably at a pH of about 3, will result in an effective separation through dissolution of vanadium from many impurities in the calcine. The results also show that the leaching is highly efficient with total leaching of $V_2O_5$ from the calcine being from 74 to 97 percent.

A series of tests or examples were run on the roasted calcine to show the solubility of its various components in water, and sulfuric and hydrochloric acids at various concentrations. As in all leaching tests, these tests were run at temperatures between 60° and 80° C with careful control of pH. The results of the tests are shown in Table III.

concentrarions not substantially stronger than pH 2, and that these impurities will be effectively separated from the dissolved vanadium by leaching the calcine at this pH and preferably at a pH of about 3. The table shows that the dissolution of elements other than vanadium from roasted coaly bed material is dependent upon the acid strength of the leachate. Since only trace quantities of lead, nickel, and chromium were leached irrespective of acid strength, these elements are unlikely to appear as significant impurities in the $FeVO_4$ product. Somewhat higher concentrations of copper, zinc, molybdenum, sodium and iron were leached and, with the possible exception of copper, the quantities leached increased with leachate acid strength. The dissolution of calcium, aluminum and phosphate during vanadium leaching was clearly dependent on acid strength and acid type. About twice as much calcium was solubilized with dilute HCl leachates than with dilute $H_2SO_4$ leachates. However, considerably more aluminum, iron and phosphate were solubilized by leachates acidified with $H_2SO_4$.

Chemical analysis of the leachates indicate that of the elements searched for, only molybdenum, calcium and phosphorus could detract from the purity of the $FeVO_4$ product. The quantity of calcium and phosphate leached from the roasted coaly bed increases significantly with the acid strength of the leachate. A comparison of the quantity of vanadium leached with the amount of impurities leached as acid strength increases, suggests that the dissolution of calcium and phosphorus can be minimized without sacrificing vanadium recovery. By leaching with acid not stronger than 0.1 percent by volume $H_2SO_4$ (23.7 lbs. $H_2SO_4$ per ton of roasted ore), vanadium recoveries of 80 percent or better can be realized while minimizing the dissolution of potential product impurities. Molybdenum dissolution was excessive at all leachate acid strengths tested. However, it was found that any molybdenum solubilized in the leach could be removed by conventional ion exchange or other procedures prior to precipitation of iron vanadate.

The selenium not volatilized during roasting but remaining in the roasted product is not acid leachable. The selenium content of acid leached tails (85 ppm) did

TABLE III

| | | Analysis of calcine components dissolved by leachates | | | | | | | | | | | | |
|---|---|---|---|---|---|---|---|---|---|---|---|---|---|---|
| Roast No | Leach Description | Final Leachate pH | Cu (ppm) | Pb (ppm) | Zn (ppm) | Ni (ppm) | Cr (ppm) | Mo (ppm) | $U_3O_8$ (ppm) | Na (ppm) | Ca (ppm) | Al (ppm) | $P_2O_5$ (ppm) | Fe (ppm) | $V_2O_5$ (ppm) |
| 53 | $H_2O$ Leach at 15% solids | 5.3 | 2 | <1 | 20 | 3 | <1 | 55 | — | 85 | 650 | 9 | 5 | 2 | 1831 |
| 52 | 0.05% $H_2SO_4$ Leach at 15% solids | 2.8 | 25 | <1 | 55 | 3 | <1 | 40 | 4.6 | — | 750 | 55 | 25 | 2 | 1740 |
| 50 | 0.1% $H_2SO_4$ Leach at 15% solids | 2.3 | 18 | <1 | 60 | 3 | <1 | 30 | 12.5 | 90 | 700 | 90 | 140 | 20 | 2014 |
| 48 | 0.5% $H_2SO_4$ Leach at 15% solids | 1.9 | 19 | <1 | 70 | 4 | 1 | 200 | — | 110 | 650 | 780 | 3800 | 50 | 2014 |
| 48-RL | Releach 48 Tails in 2% $H_2SO_4$ at 15% solids (sum total leached) | 1.6 | 22 | <1 | 120 | 6 | 2 | 220 | — | 180 | 1950 | 1780 | 9300 | 115 | 2510 |
| 53 | $H_2O$ Leach at 15% solids | 5.3 | 2 | <1 | 20 | 3 | <1 | 55 | — | 85 | 650 | 9 | 5 | 2 | 1831 |
| 51 | 0.1% HCl Leach at 15% solids | 3.1 | 13 | <1 | 60 | 2 | <1 | 50 | — | 90 | 900 | 35 | <10 | 3 | 2038 |
| 47 | 0.5% HCl Leach at 15% solids | 2.1 | 17 | <1 | 90 | 2 | <1 | 150 | — | 110 | 1400 | 220 | 650 | 8 | 2014 |
| 47-RL | Releach 47 Tails in 2% HCl at 15% solids (sum total leached) | 1.6 | 20 | 1 | 115 | 3 | 1 | 170 | — | 190 | 5400 | 2020 | 6150 | 73 | 2505 |

The results of Table III show that no more than negligible amounts of many impurities are dissolved at acid not differ from the concentration found in a pre-leach head sample (81.7 ppm).

Vanadium is precipitated from the leach slurry as iron vanadate by the addition of ferrous or ferric ion. Any ionizable iron compound will serve as the precipitant. The preferred precipitants are ferric sulfate and ferric chloride, although analagous ferrous compounds, metallic iron, and other source compounds for ionic iron are suitable.

The precipitation is performed at an acid concentration not stronger than pH 1 and, preferably at a pH of about 2.5. pH control is necessary as acid is continuously produced during the reaction of the iron compound with the vanadium compounds. Alkali metal carbonate can be used to control the pH, but its use necessitates a subsequent step to remove alkali metal by conventional procedures, such as ion exchange.

A stoichiometric amount of iron is preferably used to precipitate the vanadium present in the leach slurry. This is the optimum amount to provide a final product having a preferred commercially desirably vanadium to iron ratio, i.e. a 1/1 ratio. If quantitative recovery of vanadium is desired, the filtrate from the precipitation can be neutralized with alkali metal carbonate, preferably sodium carbonate, for complete recovery.

A typical precipitation procedure is illustrated by the following procedure used for a number of roasts for maximum vanadium recovery.

Sufficient ferric iron, as $Fe_2(SO_4)_3$, was added to each leachate to quantitatively precipitate an $FeVO_4$ product. The leachates, containing ferric iron, were heated to about 75° C and gently agitated for 3-4 hours. The precipitate was filtered, washed with demineralized water, and dried at 105° C. The filtrates were reheated and $Na_2CO_3$ added to adjust the pH of the spent leachate to about 2.5. After gently agitating the hot solution for about 1 hour, any additional precipitate formed was recovered, washed and dried. Weighed samples of dry $FeVO_4$ product were redissolved in 5 ml or concentrated HCl and diluted to 100 ml with demineralized water. These solutions were used for product purity determination. Substantially the above precipitation procedure was used on samples of the leachate solutions or leach slurries of Table III and after filtration the resulting filtrates were analyzed to compare the amounts of impurities remaining in the filtrate with those in the leach solutions of Table III before precipitation as an indication of how much of the impurities remaining in the leach slurry would be precipitated with the precipitate. The results of this procedure are set forth in Table IV.

Table IV

Analysis of calcine components remaining in leachates or filtrates after precipitation of iron vanadate from the leachates

| Sample No. | Sample Description | Cu (ppm) | Pb (ppm) | Zn (ppm) | Ni (ppm) | Cr (ppm) | Mo (ppm) | $U_3O_8$ (ppm) | Na (ppm) | Ca (ppm) | Al (ppm) | $P_2O_5$ (ppm) | Fe (ppm) | $V_2O_5$ (ppm) |
|---|---|---|---|---|---|---|---|---|---|---|---|---|---|---|
| 53 | Leachate from Roast no. 53 $H_2O$ leach; pH 5.3, Eh 260mv | 2 | <1 | 20 | 3 | <1 | 55 | — | 85 | 650 | 9 | 5 | 2 | 1831 |
| 53-HP1 | Ferric Sulfate added to precipitate $FeVO_4$; pH 1.7, Eh 670 mv | 2 | <1 | 20 | 3 | <1 | 6 | — | 75 | 700 | 10 | 4 | 300 | 171 |
| 53-HP2 | pH adjusted with $Na_2CO_3$ $H_2O$; pH 2.0, Eh 570 mv. | 2 | <1 | 20 | 2 | <1 | 0.5 | — | 1200 | 550 | 8 | 6 | 20 | 29 |
| 52 | Leachate from Roast No. 52 0.05% $H_2SO_4$; pH 2.8 Eh 520 mv | 25 | <1 | 55 | 3 | <1 | 40 | 4.6 | — | 750 | 55 | 25 | 2 | 1740 |
| 52-HP1 | Ferric Sulfate added to precipitate $FeVO_4$; pH 1.7, Eh 650 mv | 6 | <1 | 45 | 3 | <1 | 11 | — | 95 | 800 | 65 | 10 | 240 | 246 |
| 52-HP2 | pH adjusted with $Na_2CO_3$. $H_2O$; pH 2.7, Eh 430mv | 2 | <1 | 55 | 3 | <1 | <1 | — | 1400 | 650 | 65 | 8 | 45 | 25 |
| 51 | Leachate from Roast no. 51 0.1% HCl; pH 3.1, Eh 450mv | 13 | <1 | 60 | 2 | <1 | 50 | — | 90 | 900 | 35 | <10 | 3 | 2038 |
| 51-HP1 | Ferric Sulfate added to precipitate $FeVO_4$; pH 1.7, Eh 670mv | 12 | <1 | 60 | 3 | <1 | 10 | 6.3 | 90 | 850 | 40 | <10 | 360 | 291 |
| 51-HP2 | pH adjusted with $Na_2CO_3$. $H_2O$; pH 2.1, Eh 530mv | 13 | <1 | 60 | 3 | <1 | 1 | 6.7 | 1900 | 900 | 60 | <10 | 50 | 30 |
| 50 | Leachate from Roast no. 50 0.1% $H_2SO_4$; pH 2.3, Eh 650mv | 18 | 1 | 60 | 3 | 1 | 30 | 12.5 | 90 | 700 | 80 | 140 | 20 | 2014 |
| 50-HP1 | Ferric Sulfate added to precipitate $FeVO_4$; pH 1.6, Eh 670mv | 18 | 1 | 70 | 3 | 1 | 20 | 13.2 | 95 | 900 | 70 | 19 | 230 | 330 |
| 50-HP2 | pH adjusted with $Na_2CO_3$. $H_2O$; pH 2.5, Eh 440mv | 18 | 1 | 70 | 3 | 1 | 5 | 13.2 | 1600 | 600 | 75 | 4 | 19 | 30 |

A comparison of the results of Tables III and IV shows that most of the metal impurities were not precipitated with the iron vanadate precipitate. It was found that $U_3O_8$ does not precipitate with the iron vanadate precipitate and uranium can be recovered from the filtrate by conventional procedures for commercial sale.

Analytical data on the $P_2O_5$ content of leachates nos. 50, 51, 52 and 53 indicated that a purer $FeVO_4$ precipitate would be obtained from these solutions. The roasted product from test no. 53 was leached with demineralized water; roast no 52 product was leached with 0.05 percent by volume $H_2SO_4$ and roast no. 51 product with 0.1 percent HCl. Ferric iron was added to the heated leachates and the $FeVO_4$ precipitate removed by filtration. A sample of the filtrate was withdrawn for chemical analysis (sample no. HP1). The remaining filtrate was reheated and the pH adjusted with $Na_2CO_3$ to about 2.5. A second precipitate product was filtered, and a sample (designated as HP2) of spent leachate was collected for analysis. The analytical results on the spent leachate samples are summarized in Table IV.

Vanadium assays of spent leachates (sample no. HP1) indicate that between 86 and 92 percent of the $V_2O_5$ is precipitated after heating the leachate with ferric iron for 3 hours. The pH of the solution need not be adjusted with $Na_2CO_3$. Copper, lead, zinc, nickel, chromium, sodium and aluminum do not co-precipitate with $FeVO_4$. Only molybdenum, and calcium and phosphorous can be expected in the $FeVO_4$ product. Co-precipitation of calcium can be minimized by eliminating $Na_2CO_3$ addition from the precipitation procedure.

The precipitates resulting from the precipitation of ferric vanadate from the leachate solutions of roasts 50, 51 52 and 53 which resulted in the filtrates of Table IV, were analyzed to determine the amount of metal impurities remaining in the ferric vanadate precipitate. The results of these analysis are presented in Table V.

From the above results it can be seen that molybdenum and phosphorous were detected in the samples at levels of 2 percent and less than 1.7 percent by weight, respectively. Less than 0.1 percent calcium was found in precipitate samples designated HP1; however, as much as 16 percent calcium coprecipitated when $Na_2CO_3$ was added as a pH regulator. The aluminum, sodium, chromium, nickel, zinc, lead and copper content of all the samples analyzed was less than 0.1 percent by weight of dry $FeVO_4$ product.

The results set forth in Tables 11-V and illustrated by the graphs of FIGS. 2 and 3, demonstrate the effectiveness of the process of the invention for preventing impurities in the final product. For example, some of the most troublesome impurities are eliminated. Most of the selenium is eliminted in the roast and the remainder removed in the leach which does not dissolve it. Uranium was found not to precipitate with the iron vanadate. Most of the other impurities are eliminated and those remaining in the final product are not in sufficient amount to be troublesome. In respect to phosphorus, the process produces a $FeVO_4$ product assaying between 24-26 percent vanadium and containing less than 3.9 percent by weight $P_2O_5$. Molybdenum can be removed from the leach slurry before iron vanadate precipitation.

In order to evaluate the efficiency of the leaching procedure in recovering vanadium values from the roast or calcine, a series of leaching tests were run using dilute sulfuric acid at an acidity of about pH 3 in accordance with the leaching procedure previously described. The results of the tests are set forth in Table VI.

Table V

| PPT No. | Leach Description | V (%) | Fe (%) | P (%) | Ca (%) | Al (%) | Na (%) | U (%) | Mo (%) | Cr (%) | Ni (%) | Zn (%) | Pb (%) | Cu (%) |
|---|---|---|---|---|---|---|---|---|---|---|---|---|---|---|
| | Elemental Analyses (% by weight) of $FeVO_4$ precipitates from Roasts Nos. 50, 51, 51 and 53 | | | | | | | | | | | | | |
| P53-HP1 | First Precipitation, $H_2O$ leach at 15% solids | 24.5 | 35.0 | <0.05 | <0.1 | <0.1 | <0.1 | <0.01 | 2.0 | <0.1 | <0.1 | <0.05 | <0.05 | <0.03 |
| P53-HP2 | Second Precipitation, $H_2O$ leach at 15% solids | 12.1 | 25.0 | <0.05 | 7.5 | <0.1 | <0.1 | <0.01 | 1.0 | <0.1 | <0.1 | <0.05 | <0.05 | <0.03 |
| P52-HP1 | First Precipitation, 0.05% $H_2SO_4$ leach at 15% solids | 24.0 | 29.0 | 0.4 | <0.1 | <0.1 | <0.1 | <0.01 | 2.3 | <0.1 | <0.1 | <0.05 | <0.05 | <0.03 |
| P52-HP2 | Second Precipitation, 0.05% $H_2SO_4$ leach at 15% solids | 13.6 | 21.0 | 0.09 | 8.5 | <0.1 | 0.3 | <0.01 | 1.0 | <0.1 | <0.1 | <0.05 | <0.05 | <0.03 |
| P50-HP1 | First Precipitation, 0.1% $H_2SO_4$ leach at 15% solids | 23.5 | 27.0 | 1.7 | <0.1 | <0.1 | <0.1 | <0.01 | 1.9 | <0.1 | <0.1 | <0.05 | <0.05 | <0.03 |
| P50-HP2 | Second Precipitation, 0.1% $H_2SO_4$ leach at 15% solids | 10.8 | 15.0 | 0.3 | 14.0 | <0.1 | <0.1 | <0.01 | 1.3 | <0.1 | <0.1 | <0.05 | <0.05 | 0.03 |
| P51-HP1 | First Precipitation, 0.1% HCl leach at 15% solids | 24.7 | 27.0 | <0.05 | <0.1 | <0.1 | 21 0.1 | <0.01 | 2.0 | <0.1 | <0.1 | <0.05 | <0.05 | <0.03 |
| P51-HP2 | Second Precipitation, 0.1% HCl leach at 15% solids | 7.1 | 15.0 | <0.05 | 16.0 | <0.1 | <0.1 | <0.01 | 0.5 | <0.1 | <0.1 | <0.05 | <0.05 | <0.03 |

TABLE VI

Efficiency of acid leaching the calcine

| Test No. | Wt. of Calcine Sample (g) | Assay Head (% $V_2O_5$) | Calculated Head (% $V_2O_5$) | $V_2O_5$ in Tails (g) | $V_2O_5$ in Leachate (g) | $V_2O_5$ Leached (%) |
|---|---|---|---|---|---|---|
| 1 | 15.0 | 1.93 | 2.06 | 0.081 | 0.228 | 74 |
| 2 | 14.2 | 1.93 | 1.95 | 0.034 | 0.242 | 88 |
| 3 | 25.0 | 1.93 | 1.98 | 0.127 | 0.369 | 74 |
| 4 | 50.0 | 1.93 | 2.02 | 0.141 | 0.868 | 86 |
| 5 | 30.0 | 1.93 | 1.88 | 0.092 | 0.473 | 84 |
| 6 | 10.0 | 1.93 | 1.94 | 0.035 | 0.159 | 82 |
| 7 | 151.9 | 1.93 | 2.07 | (0.484) | 2.660 | 85 |
| 8 | 148.0 | 1.93 | 2.07 | (0.575) | 2.489 | 81 |
| 9 | 152.2 | 1.93 | 2.07 | (0.961) | 2.190 | 70 |
| 10 | 153.2 | 1.93 | 2.07 | (0.805) | 2.366 | 75 |

TABLE VI-continued

| Test No. | Wt. of Calcine Sample (g) | Assay Head (% $V_2O_5$) | Calculated Head (% $V_2O_5$) | $V_2O_5$ in Tails (g) | $V_2O_5$ in Leachate (g) | $V_2O_5$ Leached (%) |
|---|---|---|---|---|---|---|
| 11 | 155.4 | 1.93 | 2.07 | 0.680 | 2.543 | 79 |

The results of the table show that 70–88 percent of $V_2O_5$ can be recovered from the calcine by the leaching procedure.

A series of tests, using the precipitation procedure described above, were run at a pH of about 2 to determine the effectiveness of the $FeVO_4$ precipitation procedure. The results of those tests are recorded in Table VII.

TABLE VII

Percent vanadium precipitated from typical leachates

| | | Leachate $V_2O_5$ Concentration | | | |
|---|---|---|---|---|---|
| | Initial | After Iron Addition | | After Carbonate Addition | |
| Run No. | (g/l) | (g/l) | (% Precipitated) | (g/l) | (% Precipated) |
| 1 | 2.015 | 0.330 | 84 | 0.030 | 99 |
| 2 | 2.038 | 0.291 | 86 | 0.030 | 99 |
| 3 | 1.740 | 0.246 | 86 | 0.025 | 99 |
| 4 | 1.831 | 0.171 | 91 | 0.029 | 98 |
| 5 | 2.033 | 0.398 | 81 | 0.027 | 99 |

The results indicate that 99 percent of the $V_2O_5$ can be recovered from dilute acid leachates producing a product having a Fe/V ration of about 1. The high recoveries of $V_2O_5$ demonstrate the effectiveness of the precipitation procedure. A stoichiometric amount of iron salt must be added to precipitate the vanadium out of solution. Between 81 and 91 percent of the vanadium can be precipitated directly with the iron salts. Sodium carbonate ($Na_2CO_3$) can be used as a pH regulator to adjust the pH to 2.8 when quantitative (99%) precipitation of a iron-vanadium product is desired. Precipitation will be quantitative with either $(Fe_2(SO_4))_3.9H_2O$ or $FeCl_3.6H_2O$ as the iron source. The Fe/V ratio is independent of the leachate $V_2O_5$ grade. Ferrovanadium is, of course, produced by reduction of the iron vanadate with carbon, or by other conventional means.

Eight leach experiments (roasts nos. 55, 58–60, 62 and 64–66) were conducted to determine whether spent leachate solutions could be recycled back into the vanadium leach circuit. Previous testing demonstrated that vanadium precipitation from fresh leachates could be accomplished in either of two ways: (1) adding a stoichiometric amount of iron as Fe2(SO4)3 to hot leachates precipitated between 86 and 92 percent of the vanadium and, (2) adjusting the final pH of the iron containing leachate to about 3 with sodium carbonate precipitated better than 99 percent of the vanadium. Spent leachates from the former precipitation step were designated as HP1 and spent leachates from the latter were designated as HP2. Freshly roasted coaly bed material was leached witn either HP1 or HP2 spent leachates. The predent V205 leached from the roasted product of each test is summarized in Table VIII.

TABLE VIII

Percent $V_2O_5$ leached from oxygen roasted coaly bed material with spent leachate

| Roast No. | Leach Description | Percent $V_2O_5$ Leached | | |
|---|---|---|---|---|
| | | First Leach | Second Leach | Total |
| 55 | Product leached with 54-RL solution; tails releached in | 81 | 4 | 85 |

TABLE VIII-continued

Percent $V_2O_5$ leached from oxygen roasted coaly bed material with spent leachate

| Roast No. | Leach Description | Percent $V_2O_5$ Leached | | |
|---|---|---|---|---|
| | | First Leach | Second Leach | Total |
| 58 | 0.1% $H_2SO_4$. Product leached with 57-HP1 solution; tails releached with 57-HP1 solution. | 54 | 2 | 56 |
| 59 | Product leached with 58-HP1 solution; tails releached with 58-HP1 solution. | 64 | 3 | 67 |
| 62 | Product leached with 61-HP1 solution; tails releached with 61-HP2 solution; no fresh acid added. | 58 | 7 | 65 |
| 64 | Product leached with acidified 63-HP2; tails releached with acidified 63-HP2. | 75 | 5 | 80 |
| 65 | Product leached with iron deficient 64-HP1; tails releached with iron deficient 64-HP1. | 68 | 4 | 72 |
| 66 | Product leached with acidified 65-HP2; tails releached with acidified 65-HP2; product oxygen roasted for less than 6 hours. | 64 | 5 | 69 |

The results support the feasibility of recycling the spent leachate from the precipitation step to the leach step after removal of uranium and other impurities. Excess iron from the precipitation step can be removed if necessary.

The leaching procedure of the process was tested to determine its effectiveness in leaching $V_2O_5$ from vanadium scrap material, spent hydrocarbon catalyst. Four roasts were run on samples of a spent hydrocarbon catalyst assaying high (5–7 percent by weight $V_2O_5$) in vanadium content. In roast no. 70 exactly 250 g of spent catalyst were air roasted at 600° C and leached at 30 percent solids with 2 percent by volume $H_2CO_4$. Oxygen roasts were conducted on the remaining three 250 g samples. In each roast, the catalyst was first air roasted at 600° C for 3–4 hours, and then oxygen roasted at 800° C for 10–14 hours. The roasted product from roast no. 70 was leached at 15 percent solids in 0.1 percent $H_2SO_4$ and releached in 2.0 percent $H_2SO_4$. Roasted product no. 71 was leached and releached at 15 percent solids in 2.0 percent $H_2SO_4$ and roasted product 72 was leached and releached at 15 percent solids in 0.1 percent by volume $H_2SO_4$. The results are presented in Table IX.

TABLE IX

| Roast No. | Roast Description | Leach Description | $V_2O_5$ Leached (g) |
|---|---|---|---|
| | Recovery of $V_2O_5$ by acid leaching 250 g of spent hydrocarbon catalyst | | |
| 69 | Air roast at 600° C for 4 hours | $H_2SO_4$ leach (2% by volume) at 30% solids. | 4.7304 |
| 70 | Oxygen roast at 800° C for 12 hours | $H_2SO_4$ leach (0.1% by volume) at 15% solids; releached in 2% $H_2SO_4$ at 15% solids. | 13.2664 |
| 71 | Oxygen roast at 800° C for 10 hours | $H_2SO_4$ leach (2.0% by volume) at 15% solids; releached in 2% $H_2SO_4$ at 15% solids. | 18.1277 |
| 72 | Oxygen roast at 800° C for 14 hours | $H_2SO_4$ leach (0.1% by volume) at 15% solids; releached in 0.1% $H_2SO_4$ at 15% solids. | 8.1926 |

The results show the necessity of the oxygen roast. More importantly, the results show that the process is effective for recovering vanadium from vanadium scrap, a recovery in excess of 80 percent having been made in roast no. 71.

TABLE X

X-ray fluorescence analysis of ferrovanadium prepared from $FeVO_4$ product precipitated from leachates of roast nos. 59-53

| | | | |
|---|---|---|---|
| Copper | Iron | 39. | Lanthanum |
| Silver | Cobalt | | Cerium |
| Gold | Nickel | 0.015 | Praseodymium |
| Zinc | Cesium | | Neodymium |
| Cadmium | Rubidium | | Samarium |
| Mercury | Barium | | Europium |
| Gallium | Strontium | | Gadolinium |
| Indium | Titanium | 0.089 | Terbium |
| Thallium | Zirconium | | Dysprosium |
| Germanium | Hafnium | | Holmium |
| Tin | Thorium | | Erbium |
| Lead | Vanadium | 42. | Thulium |
| Arsenic | Columbium | | Ytterbium |
| Antimony | Tantalum | | Lutetium |
| Bismuth | Chromium | | Yttrium |
| Selenium | Molybdenum | 3.3 | |
| Tellurium | Tungsten | | |
| Bromine | Uranium | | |
| Iodine | Manganese | | |

Table X summarizes the analytical report on ferrovanadium prepared by reducing the $FeVO_4$ product precipitated from leachates of roast nos 50-53. The values are estimated weight percentages based on x-ray fluorescence analyses. Where percentages are not reported, the element was not detected in the alloy. The high content of molybdenum occurs because the usual molybdenum removal step was omitted. The results demonstrate the purity of the product which can be obtained having an iron to vanadium ratio of about one to one.

What is claimed is:

1. A process for recovering vanadium values from vanadium ore and vanadium scrap such as vanadium bearing catalyst which comprises:
   (a) roasting the vanadium ore or vanadium scrap in air at a temperature not in excess of 600° C for a sufficient time to remove substantially all of the carbonaceous material present in the ore or scrap;
   (b) roasting the calcine from step (a) in a pure oxygen atmosphere at a temperature of at least about 750° C for a period sufficient to convert substantially all of the vanadium in the calcine to a soluble state;
   (c) leaching the calcine from step (b) to a pH from neutral to about 2 in water or a dilute solution of an acid selected from the group consisting of sulfuric, hydrochloric and nitric acids to solubize vanadium values and leave substantially all impurities undissolved;
   (d) performing a luquid-solids separation on the leach slurry of Step (c);
   (e) precipitating substantially all of the vanadium values from the filtrate from step (d) with an inorganic iron salt at an acidity no stronger than about pH 1; and
   (f) recovering the precipitated vanadium values from step (e) by liquid-solids separation.

2. The process of claim 1 in which the filtrate of step (f) is recycled to leaching step (c).

3. The process of claim 1 in which the leachant used in step (c) is water.

4. The process of claim 1 in which the lechant used in step (c) is sulfuric acid.

5. The process of claim 1 in which the leachant used in step (c) is hydrochloric acid.

6. The process of claim 1 in which the leachant used in step (c) is nitric acid.

7. The process of claim 1 in which the leaching of step (c) is performed at a pH of about 2-5.

8. The process of claim 1 in which the precipitation of step (e) is performed at a pH of about 2.5.

9. The process of claim 1 in which the precipitate of step (f) is reduced to produce a ferro-vanadium product.

10. The process of claim 9 in which the reduction is performed with carbon under vacuum to produce a low impurity product.

11. The process of claim 10 in which the product has an iron to vanadium ration of about one to one.

* * * * *